US006963729B2

(12) United States Patent
Uozumi

(10) Patent No.: US 6,963,729 B2
(45) Date of Patent: Nov. 8, 2005

(54) ANTENNA DEVICE OF INTERROGATOR

(75) Inventor: Gakuji Uozumi, Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 531 days.

(21) Appl. No.: 09/866,722

(22) Filed: May 30, 2001

(65) Prior Publication Data

US 2002/0017980 A1 Feb. 14, 2002

(30) Foreign Application Priority Data

May 30, 2000 (JP) .......................... P2000-160900

(51) Int. Cl.[7] ................................................ H04B 1/00
(52) U.S. Cl. ...................... 455/42; 455/41.1; 455/41.2; 455/41.3; 340/572.5; 340/10.1
(58) Field of Search ............................ 455/41.1, 41.2, 455/41.3, 42, 45, 575.1; 340/572.5, 10.1

(56) References Cited

U.S. PATENT DOCUMENTS

| | | | | |
|---|---|---|---|---|
| 6,317,027 | B1 * | 11/2001 | Watkins | 340/10.1 |
| 6,472,975 | B1 * | 10/2002 | Beigel et al. | 340/10.1 |
| 6,535,108 | B1 * | 3/2003 | Schrott et al. | 340/10.1 |

FOREIGN PATENT DOCUMENTS

| | | | |
|---|---|---|---|
| CH | 667955 | A5 | 11/1988 |
| DE | 88 00 025 | | 4/1988 |
| GB | 294300 | | 7/1928 |
| GB | 2 321 726 | A | 8/1998 |
| JP | A-7-263936 | | 10/1995 |
| WO | WO 93/23908 | A1 | 11/1993 |
| WO | WO 96/13792 | A1 | 5/1996 |

OTHER PUBLICATIONS

European Search Report dated Oct. 20, 2004.

* cited by examiner

*Primary Examiner*—Lee Nguyen
*Assistant Examiner*—Sanh Phu
(74) *Attorney, Agent, or Firm*—Rader, Fishman & Grauer PLLC

(57) ABSTRACT

An antenna device of an interrogator which constitutes an automatic identification system by exchanging information with an IC tag attached to an object to be identified by electromagnetic coupling is disclosed. The antenna device comprises an antenna element, and a capacitor connected in series to the antenna element and having a variable capacitance to maintain a predetermined resonance frequency. The predetermined resonance frequency is maintained by switching taps on an antenna coil. Alternatively, the predetermined resonance frequency is maintained by switching taps on a tapped inductor or by a variable inductor.

14 Claims, 2 Drawing Sheets

ANTENNA DEVICE OF INTERROGATOR

BACKGROUND OF THE INVENTION

1. Field of the Invention

The present invention relates to an improvement in an antenna device of an interrogator which constitutes an automatic identification system by exchanging information with an IC tag attached to an object by electromagnetic coupling. More particularly, the invention relates to a technique of maintaining a tuning frequency even when a metal body is present at the back of the antenna, thereby ensuring a communicatable distance.

2. Description of the Related Art

Identification systems which use bar codes as automatic identification means for identifying a target object have been widely used. As bar-code systems use inexpensive media for identification, are highly reliable, and have international standards, their use environments are being improved.

These bar-code systems, however, suffer from the small amount of data which is retainable on media to be identified, and they are basically designed exclusively to read data. That is, these bar-code systems cannot rewrite data.

As IC technology advances, attention is being focused on a data carrier (RF-ID) automatic identification system that has a combination of an IC tag which transmits and receives radio wave signals and an interrogator.

This automatic identification system has advantages in that the memory in an IC chip incorporated in an IC tag as a medium to be identified is rewritable and can handle a larger amount of data.

In particular, the type that activates an internal circuit of an IC tag with power supplied by electromagnetic coupling with an interrogator does not require a battery to be installed in the IC tag, which can be used almost indefinitely.

If a metal body is present at the back of the antenna device of the interrogator, however, the mutual induction of the antenna and the metal body reduces the inductance component of the antenna. This shifts the antenna resonance frequency to the high frequency side. Furthermore, the eddy current induced on the surface of the metal body increases the resistance component of the antenna, and thereby reduces the Q value of the antenna. These phenomena lower the electromotive force that is induced in the coil of the IC tag, disabling communications.

As a solution to this problem and to reduce the influence when a ferromagnetic material comes into proximity to the back of an antenna, an antenna device disclosed in Japanese Patent Application, First Publication, No. Hei 7-263936 is designed so as to retain a loop antenna in a case which constitutes a box and to have a non-magnetic material with a high dielectric constant located at the back of the loop antenna with an air layer of a predetermined thickness in between.

This structure allows the radio wave radiation pattern of the entire antenna to be nearly equal to that of a single antenna unit even if a ferromagnetic material is at the back of the antenna. This can ensure a communication distance equivalent to the one provided in the case of a single antenna unit, without reducing the electromotive force induced in the coil of the IC tag.

The aforementioned structure of the antenna device is complicated and requires a greater number of manufacturing steps, resulting in increased cost.

Furthermore, because the antenna characteristic cannot be adjusted in accordance with the environment at the antenna site, the tuning of the antenna may not always be optimal.

That is, without a ferromagnetic body, such as a metal plate, present in the vicinity of the antenna site, the particular design is not only insignificant but also reduces the Q value of the antenna.

SUMMARY OF THE INVENTION

Accordingly, it is an object of the present invention to provide an antenna device of an interrogator which has a resonance-frequency varying capability so that the tuning frequency is maintained in the vicinity of a predetermined value regardless of the environment of the antenna site.

It is another object of the invention to provide an antenna device of an interrogator which can ensure a predetermined communication distance by increasing the electromotive force induced on the coil of an IC tag by raising the drive voltage of the antenna when the electromotive force induced in the coil of the IC tag drops due to a reduction in the Q value of the antenna caused by the close proximity of a metal body to the antenna.

To achieve the above objects, according to one aspect of the invention, there is provided an antenna device of an interrogator which constitutes an automatic identification system by exchanging information with an IC tag attached to an object to be identified by electromagnetic coupling. The antenna device comprises an antenna element and a capacitor connected in series to the antenna element and having a variable capacitance to maintain a predetermined resonance frequency.

As the capacitance of the capacitor connected in series to the antenna element is changed, the resonance frequency that has been shifted due to the approach of a metal body or the like is set back to a predetermined frequency to restore the electromagnetic coupling with the IC tag. This can prevent communications from being disabled.

The capacitance of the capacitor may be made variable by switching a switch.

The structure can permit the resonance frequency to be changed step by step by changing the capacitance of the capacitor step by step by means of a switch.

According to the second aspect of the invention, there is provided an antenna device of an interrogator which constitutes an automatic identification system by exchanging information with an IC tag attached to an object to be identified by electromagnetic coupling. The antenna device comprises an antenna coil having taps which are switched from one to another to maintain a predetermined resonance frequency.

As the antenna coil is provided with a plurality of taps, one of which is selectively connectable, the predetermined resonance frequency can be maintained.

According to the third aspect of the invention, there is provided an antenna device of an interrogator which constitutes an automatic identification system by exchanging information with an IC tag attached to an object to be identified by electromagnetic coupling. The antenna device comprises an antenna coil and an inductor connected in series to said antenna coil and having taps which are switched from one to another to maintain a predetermined resonance frequency.

Since one of taps of the tapped inductor connected in series to the antenna coil is selectively connected, the predetermined resonance frequency can be maintained.

According to the antenna device of the second or third aspect of the invention, the taps may be switched by switching a switch.

With this structure, taps on the antenna coil or taps on the tapped inductor may be switched using a switch.

According to any one of the antenna devices mentioned above, the switch may be a semiconductor switch which is controlled by a control circuit for detecting a deviation of the resonance frequency and controlling the resonance frequency to a predetermined frequency.

With this structure, the capacitance of the capacitor or taps on the antenna coil may be switched by a semiconductor switch which is controlled by the control circuit that detects a deviation of the resonance frequency and operates in accordance with the detected deviation.

According to the fourth aspect of the invention, there is provided an antenna device of an interrogator which constitutes an automatic identification system by exchanging information with an IC tag attached to an object to be identified by electromagnetic coupling. The antenna device comprises an antenna coil and a variable inductor, connected in series to the antenna coil, for maintaining a predetermined resonance frequency.

This structure can maintain the resonance frequency at a predetermined value by adjusting the inductance of the variable inductor connected in series to the antenna element.

According to the antenna device of the fourth aspect of the invention, the variable inductor may be controlled by a control circuit for detecting a deviation of the resonance frequency and controlling the resonance frequency to a predetermined frequency.

According to this structure, the variable inductor is controlled by the control circuit to maintain the resonance frequency at a predetermined value.

According to any one of the above-described antenna devices, a predetermined communication distance is ensured by varying a drive voltage of the antenna device.

This structure can maintain a predetermined state of coupling to the IC tag by changing the voltage for driving the antenna device of the interrogator.

DETAILED DESCRIPTION OF THE PREFERRED EMBODIMENTS

Figure 1:
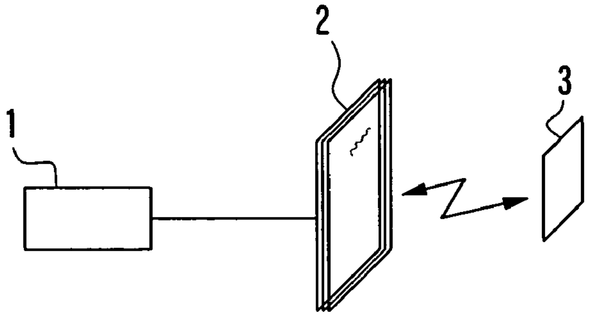
FIG. 1 is a diagram illustrating the structure of a data carrier (RF-ID) automatic identification system.

Preferred embodiments of the present invention will now be described with reference to the accompanying drawings. FIG. 1 illustrates the structure of a data carrier (RF-ID) automatic identification system.

Referring to the diagram, an interrogator 1 feeds high-frequency power to an object to be identified (not shown) to an IC tag 3 via an antenna device 2 to thereby activate the internal circuit of the IC tag 3 and exchanges identification (ID) information with the IC tag 3.

The interrogator 1 identifies the object to be identified based on the acquired ID information and provides an external computer (not shown) or the like with control information to perform predetermined control.

Figure 2:
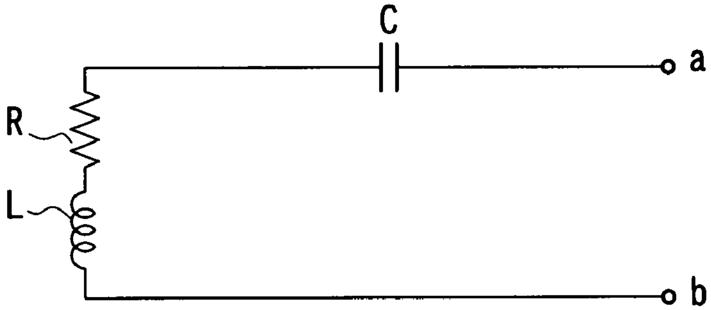
FIG. 2 is a diagram showing an equivalent circuit of an antenna device 2 in FIG. 1.

FIG. 2 shows an equivalent circuit of the antenna device 2 in FIG. 1.

In the figure, the symbol "L" denotes the inductance component of the antenna, and the symbol "R" denotes the resistance component of the antenna. The symbol "C" denotes a capacitor connected in series to the antenna to tune the antenna device 2 to an arbitrary frequency.

The antenna device 2, in one example, has a size of 76 cm×76 cm and has 21 turns in the antenna with an inductance component L=976.3 $\mu$ H, the resistance component R=20.38 Ω and the capacitance C=1638 pF.

When a metal body comes close to the antenna device 2 which is expressed by the equivalent circuit in FIG. 2, their mutual induction reduces the inductance of the inductance component L of the antenna. This increases the resonance frequency of the antenna. Furthermore, the eddy current that is induced on the surface of the metal body increases the value of the resistance component R of the antenna, thus lowering the Q value of the antenna.

The increase in the resonance frequency of the antenna disrupts the tuning to the IC tag, so that the electromotive force induced in the coil of the IC tag 3 drops. This shortens the communication distance and may disable communications.

As the reduced Q value of the antenna decreases the radiation efficiency of the antenna, the radiation power of the antenna drops. As a result, the electromotive force induced on the coil of the IC tag 3 is lowered. This shortens the communication distance and may disable communications.

To maintain a proper communication state by making the electromagnetic coupling between the antenna device 2 of the interrogator 1 and the IC tag stronger, it therefore is necessary to maintain the resonance frequency at a predetermined value by increasing the capacitor C in association with the reduction in the inductance of the inductance component L of the antenna when the metal body comes into proximity with the antenna, or increasing the inductance of the inductance component L of the antenna.

It is also necessary to maintain the radiation power of the antenna at a predetermined value by increasing the input power to the antenna.

The following will describe several embodiments for maintaining the resonance frequency at a predetermined value by increasing the capacitor C in association with the reduction in the inductance of the inductance component L of the antenna when the metal body comes into proximity with the antenna, or increasing the inductance of the inductance component L of the antenna.

First Embodiment

Figure 3:
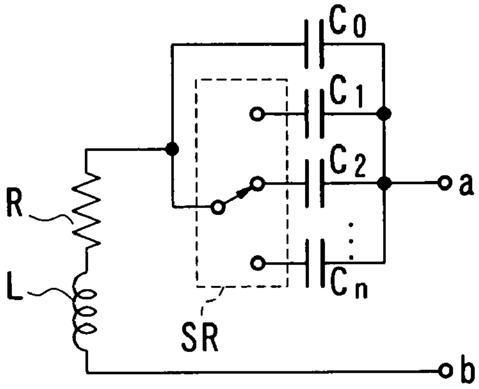
FIG. 3 is a structural diagram of a first embodiment of the invention.

FIG. 3 is a structural diagram of the first embodiment of the invention.

In this figure, the inductance component L of the antenna and the resistance component R of the antenna are the same constituting elements as those shown in FIG. 2, and capacitors C0, C1, C2, . . . , and Cn are provided in place of the capacitor C in FIG. 2. The capacitors C0, C1, C2, . . . , and Cn have one ends connected together.

The other ends of the capacitors C1, C2, . . . , and Cn are connected to respective selectable contacts of a rotary switch SR whose common contact is connected to the other end of the capacitor C0.

This structure permits the capacitor C0 to be connected in parallel to one of the capacitors C1, C2, . . . , and Cn. If the capacitors C1, C2, . . . , and Cn have different capacitances, the combined capacitance can be made variable.

Therefore, the resonance frequency of the antenna device can be kept at a predetermined value step by step by manipulating the rotary switch SR in such a way as to cancel a change in the inductance of the inductance component L of the antenna, e.g., by manipulating the rotary switch SR in such a way as to increase the capacitance when the inductance decreases.

Second Embodiment

Figure 4:
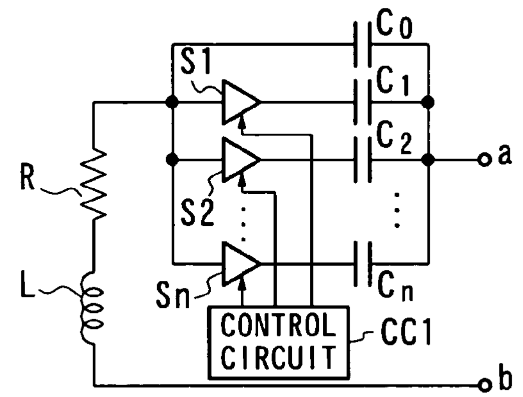
FIG. 4 is a structural diagram of a second embodiment of the invention.

FIG. 4 shows the second embodiment of the invention.

The capacitors C0, C1, C2, . . . , and Cn in this figure respectively correspond to those capacitors with the same symbols in FIG. 3. In the second embodiment, semiconductor switches S1, S2, . . . , and Sn are provided in place of the rotary switch SR.

The opening and closing of the semiconductor switches S1, S2, . . . , and Sn are controlled by a control circuit CC1 in such a way as to maintain the resonance frequency of the antenna device at a predetermined value.

In this example, only one of the semiconductor switches S1, S2, . . . , and Sn may be turned on or plural semiconductor switches may be turned on to increase the combined capacitance.

Third Embodiment

Figure 5:
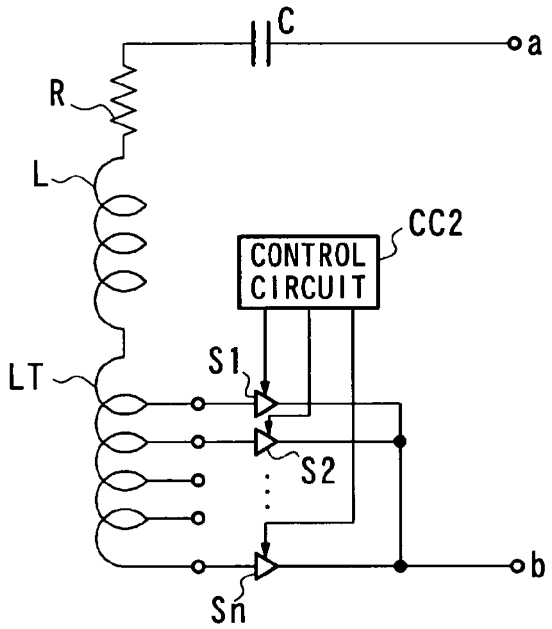
FIG. 5 is a structural diagram of a third embodiment of the invention.

FIG. 5 shows the third embodiment of the invention.

In this embodiment, the capacitor C is fixed, and the inductance of a tapped inductor LT connected in series to the LR circuit is changed by switching the taps on the inductor LT, thereby varying the inductance of the inductor L.

The opening and closing of the semiconductor switches S1, S2, . . . , and Sn are controlled by a control circuit CC2 in such a way as to maintain the resonance frequency of the antenna device at a predetermined value. It is to be noted, however, that unlike the second embodiment, the third embodiment controls the switching action so as to turn on only one of the semiconductor switches S1, S2, . . . , and Sn.

As a modification of the third embodiment, taps may be provided on the antenna coil instead of providing the tapped inductor LT so that the resonance frequency is adjusted by switching the taps from one to another.

Fourth Embodiment

Figure 6:
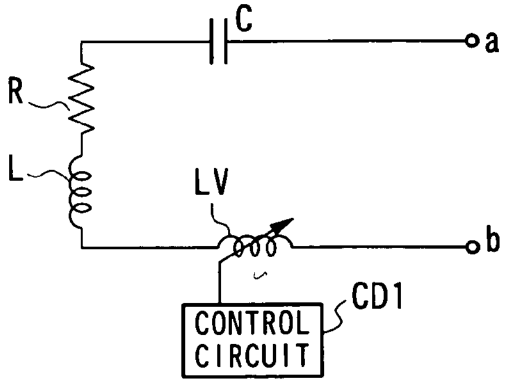
FIG. 6 is a structural diagram of a fourth embodiment of the invention.

FIG. 6 shows the fourth embodiment of the invention.

The illustrated fourth embodiment uses a variable inductor LV capable of continuously changing the inductance, in place of the tapped inductor LT.

The inductance of the variable inductor LV varies as the position of the magnetic body inserted through the coil is changed. The position of the magnetic body is controlled by a control circuit CD1 in such a way as to keep the resonance frequency of the antenna device at a predetermined value.

In all of the embodiments, when a metal body is located near the antenna device, the Q value of the antenna decreases, which unavoidably causes the radiation power of the antenna to drop. It is often necessary to increase the power input to the antenna to ensure the predetermined radiation power.

Although the operations of the embodiments of the invention have been described in detail with reference to the accompanying drawings, it will be apparent to those skilled in the art that the invention is not limited to these embodiments and that other design modifications or the like are possible within the spirit or scope of the invention.

Although the third embodiment shown in FIG. 5 changes the taps on the tapped inductor by semiconductor switches, the taps may, for example, be switched from one to another by a rotary switch as well.

According to the invention, as described above, even when the inductance component of the antenna varies, the capacitance of the capacitor connected in series to the antenna is changed. This can provide such advantages that the antenna characteristic can be easily adjusted in such a way as to maintain the resonance frequency of the antenna device at a predetermined value, the electromagnetic coupling with the IC tag is maintained strong and a good communication state can be maintained.

In a different mode, even when the inductance component of the antenna varies, the inductance of the inductor connected in series to the antenna is changed to maintain the combined inductance at a predetermined value. This can likewise provide the advantages that the antenna characteristic can be easily adjusted in such a way as to maintain the resonance frequency of the antenna device at a predetermined value, the electromagnetic coupling with the IC tag is maintained strong and a good communication state can be maintained.

What is claimed is:

1. An antenna device of an interrogator having a resonance frequency of a predetermined value which constitutes an automatic identification system by exchanging information with an IC tag attached to an object to be identified by electromagnetic coupling, comprising:

an antenna element including an antenna coil fabricated from at least one turn of an electrically conductive material, a resistance component and an inductance component connected in series with the antenna coil; and a capacitor which is connected in series to said antenna element with the resistance component disposed between the capacitor and the inductance component, the capacitor having a variable capacitance to maintain the resonance frequency of the antenna device at the predetermined value.

2. The antenna device according to claim 1, wherein said capacitance of said capacitor is made variable by switching a switch.

3. An antenna device of an interrogator having a resonance frequency of a predetermined value which constitutes an automatic identification system by exchanging information with an IC tag attached to an object to be identified by electromagnetic coupling, comprising:

an antenna element including an antenna coil fabricated from at least one turn of an electrically conductive material, a resistance component, a tapped inductor and a fixed capacitor connected in series with the antenna coil with the resistance component disposed between the tapped inductor and the fixed capacitor, the tapped inductor having taps which are switched from one to another to maintain the resonance frequency of the antenna device at the predetermined value.

4. An antenna device of an interrogator having a resonance frequency of a predetermined value which constitutes an automatic identification system by exchanging information with an IC tag attached to an object to be identified by electromagnetic coupling, comprising:

an antenna element including an antenna coil fabricated from at least one turn of an electrically conductive material, a resistance component, an inductance component and a fixed capacitor connected in series with the antenna coil with the resistance component disposed between the inductance component and the fixed capacitor; and a tapped inductor which is connected in series to said antenna element and having taps which are switched from one to another to maintain the resonance frequency of the antenna device at the predetermined value.

5. The antenna device according to claim 3, wherein said taps are converted by switching a switch.

6. The antenna device according to claim 2, wherein said switch is a semiconductor switch which is controlled by a control circuit for detecting a deviation of said resonance frequency and controlling said resonance frequency to a predetermined frequency.

7. An antenna device of an interrogator having a resonance frequency of a predetermined value which constitutes an automatic identification system by exchanging information with an IC tag attached to an object to be identified by electromagnetic coupling, comprising:

an antenna element including an antenna coil fabricated from at least one turn of an electrically conductive material, a resistance component and a fixed capacitor connected in series with the antenna coil; and a variable inductor, connected in series to said antenna coil with the resistance component disposed between the variable inductor and the fixed capacitor, the variable inductor operative for maintaining the resonance frequency of the antenna device at the predetermined value.

8. The antenna device according to claim 7, wherein said variable inductor is controlled by a control circuit for detecting a deviation of resonance frequency and controlling resonance frequency to a predetermined frequency.

9. The antenna device according to claim 1, wherein a predetermined communication distance is ensured by varying a drive voltage of said antenna device.

10. The antenna device according to claim 5, wherein said switch is a semiconductor switch which is controlled by a control circuit for detecting a deviation of said resonance frequency and controlling said resonance frequency to a predetermined frequency.

11. The antenna device according to claim 3, wherein a predetermined communication distance is ensured by varying a drive voltage of said antenna device.

12. The antenna device according to claim 1, further comprising a control circuit for controlling an amount of capacitance in order to maintain the resonance frequency of the antenna device at the predetermined value.

13. The antenna device according to claim 4, further comprising a control circuit for controlling an amount of inductance of the tapped inductor in order to maintain the resonance frequency of the antenna device at the predetermined value.

14. The antenna device according to claim 7, further comprising a control circuit for controlling an amount of inductance of the variable inductor in order to maintain the resonance frequency of the antenna device at the predetermined value.

* * * * *